US012684223B2

(12) United States Patent     (10) Patent No.:   US 12,684,223 B2

Kimura     (45) Date of Patent:   *Jul. 14, 2026

(54) IMAGE PROCESSING APPARATUS, IMAGING APPARATUS, AND CONTROL METHOD USING GAZE DETECTION FOR OBJECT TRACKING

(71) Applicant: CANON KABUSHIKI KAISHA, Tokyo (JP)

(72) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 18/610,894

(22) Filed: Mar. 20, 2024

(65) Prior Publication Data

US 2024/0236473 A1    Jul. 11, 2024

Related U.S. Application Data

(60) Continuation of application No. 17/848,785, filed on Jun. 24, 2022, now Pat. No. 11,962,887, which is a continuation of application No. 16/731,172, filed on Dec. 31, 2019, now Pat. No. 11,399,131, which is a division of application No. 15/888,200, filed on Feb. 5, 2018, now Pat. No. 10,542,206.

(30) Foreign Application Priority Data

Feb. 8, 2017   (JP) ................................. 2017-021134

(51) Int. Cl.
| | |
|---|---|
| *H04N 23/611* | (2023.01) |
| *H04N 23/63* | (2023.01) |
| *H04N 23/67* | (2023.01) |

(52) U.S. Cl.
CPC ........... *H04N 23/611* (2023.01); *H04N 23/63* (2023.01); *H04N 23/67* (2023.01)

(58) Field of Classification Search
CPC ....... H04N 23/611; H04N 23/63; H04N 23/67
See application file for complete search history.

(56) References Cited

U.S. PATENT DOCUMENTS

| | | | |
|---|---|---|---|
| 5,808,678 | A | 9/1998 | Sakaegi |
| 7,978,879 | B2 | 7/2011 | Muramatsu |

(Continued)

FOREIGN PATENT DOCUMENTS

| | | |
|---|---|---|
| JP | 05-232374 A | 9/1993 |
| JP | 2015-022207 A | 2/2015 |

*Primary Examiner* — Padma Haliyur

(74) *Attorney, Agent, or Firm* — Cowan, Liebowitz & Latman, P.C.

(57) ABSTRACT

An imaging apparatus performs control to display first region information indicating a first region that is a region gazed at by a user and second region information indicating a second region that is a region of a main object within a region of a shot image region so as to be distinguishably superimposed on the shot image. In the above control, the imaging apparatus displays the first region information and the second region information based on the information on the identical position before the first instruction means is operated, and after the first instruction means is operated, the first region information and the second region information are displayed based on information of different positions corresponding to each region.

20 Claims, 6 Drawing Sheets

(56)          References Cited

U.S. PATENT DOCUMENTS

| | | | |
|---|---|---|---|
| 8,144,118 B2 * | 3/2012 | Hildreth ................. | A63F 13/56 |
| | | | 463/2 |
| 8,284,256 B2 | 10/2012 | Miyata | |
| 8,493,494 B2 | 7/2013 | Sakai et al. | |
| 2011/0141011 A1 * | 6/2011 | Lashina ................. | G06Q 30/02 |
| | | | 345/156 |
| 2012/0146891 A1 * | 6/2012 | Kalinli ................... | H04N 19/33 |
| | | | 345/156 |
| 2016/0077585 A1 | 3/2016 | Mizuhara | |
| 2016/0209657 A1 | 7/2016 | Popovich et al. | |
| 2016/0309081 A1 | 10/2016 | Frahm et al. | |
| 2018/0129283 A1 | 5/2018 | Lee et al. | |
| 2018/0130194 A1 | 5/2018 | Kochura et al. | |

* cited by examiner

FIG. 4A
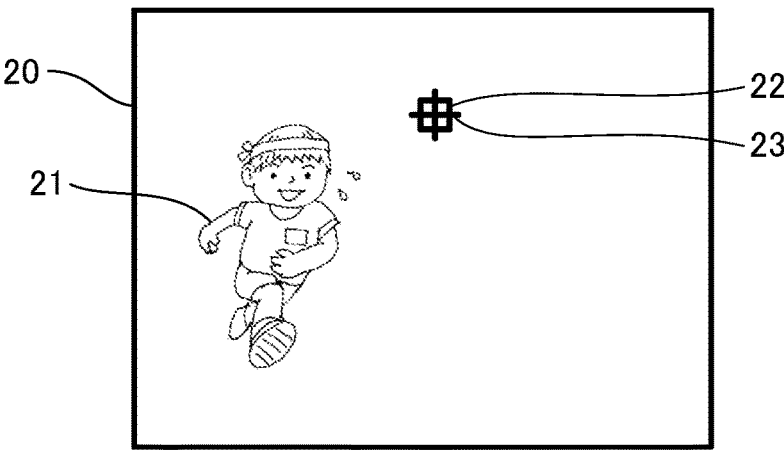
FIG. 4B
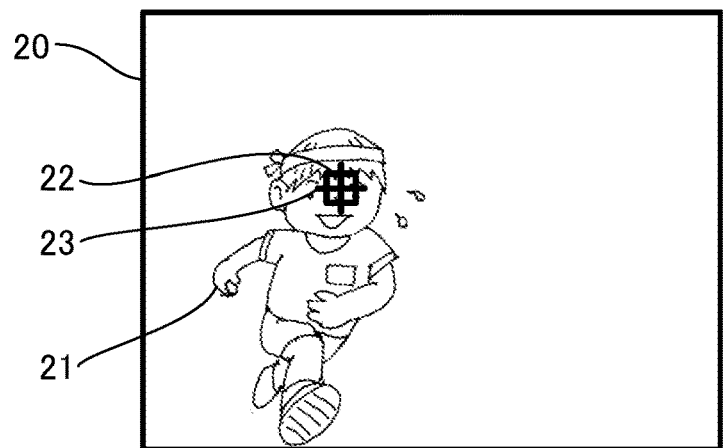
FIG. 4C

FIG. 6A
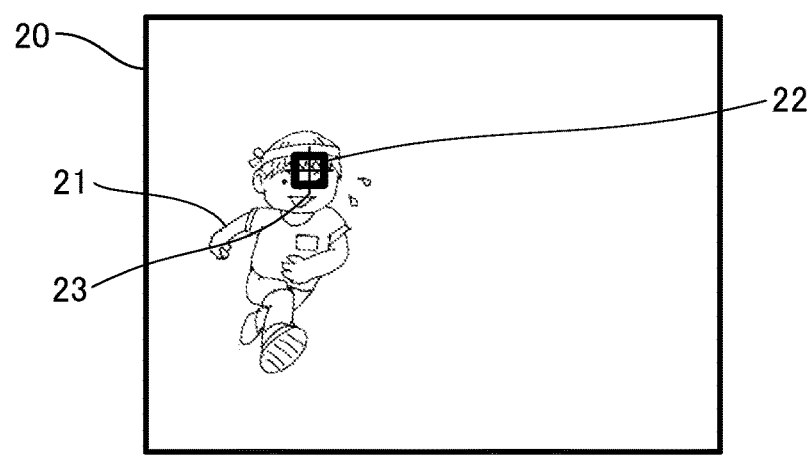
FIG. 6B
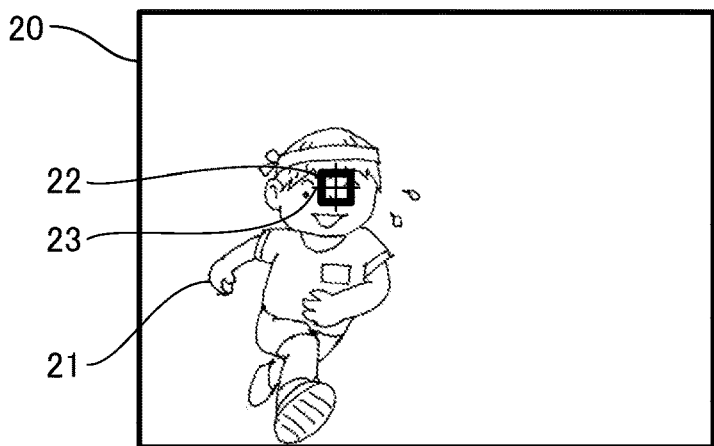
FIG. 6C

IMAGE PROCESSING APPARATUS, IMAGING APPARATUS, AND CONTROL METHOD USING GAZE DETECTION FOR OBJECT TRACKING

CROSS-REFERENCE TO RELATED APPLICATION

This application is a continuation of application Ser. No. 17/848,785, filed Jun. 24, 2022, which is a continuation of application Ser. No. 16/731,172, filed Dec. 31, 2019, which issued as U.S. Pat. No. 11,399,131 on Jul. 26, 2022 which is a divisional of application Ser. No. 15/888,200, filed Feb. 5, 2018, which issued as U.S. Pat. No. 10,542,206 on Jan. 21, 2020, the entire disclosures of which are hereby incorporated by reference.

BACKGROUND OF THE INVENTION

Field of the Invention

The present invention relates to an image processing apparatus, an imaging apparatus, and a control method.

Description of the Related Art

As a result of the progress of the improvement in functionality of imaging apparatuses, an imaging apparatus having a function that further enables an operation in response to a user's intuition, for example, a function that provides instructions for a focusing position by using a touch panel, has been proposed. Additionally, an interface utilizing a result for the detection of a gaze region that is a region being gazed at by the user has conventionally been proposed.

Japanese Patent Application Laid-Open No. 2015-22207 discloses a technique that performs focusing in response to the intention by a user by setting a priority of each detection unit with reference to the setting of a camera (referred to as a "mode"), in addition to the result of the detection of the gaze region and the result of the detection of an object. Additionally, Japanese Patent Application Laid-Open No. 5-232374 discloses a method of determining a final object position by determining the reliability of the gaze region detection in an object tracking system using the detection of the gaze region and photometric means.

In neither of the techniques in Japanese Patent Application Laid-Open No. 2015-22207 nor Japanese Patent Application Laid-Open No. 5-232374 are the region of the main object for performing focusing and the gaze region displayed in a separately recognizable manner. Here, if an error is cased in the determination of the result of the detection of the object or the result of the photometry, a tracking frame and the like are displayed on the region of the object not intended by the user, and as a result, the user has an unnatural feeling. In contrast, if both the region of the main object and the gaze region are always recognizably displayed before the shooting field angle and the main object are determined, the display may be confusing and visually undesirable for the user.

SUMMARY OF THE INVENTION

The present invention improves the usability for this display by improving the method of displaying a region of a main object and a gaze region.

An image processing apparatus according to an embodiment of the present invention comprises: circuitry which obtains a shot image; detects a first region that is a region gazed at by a user within a region of the shot image; determines a second region that is a region of a main object within the region of the shot image; and performs control to display first region information indicating the first region and second region information indicating the second region so as to be distinguishably superimposed on the shot image; wherein, before the first instruction member is operated, the circuitry displays the first region information and the second region information based on information on the identical position, and after the first instruction member is operated, the circuitry displays the first region information and the second region information based on information on different positions corresponding to each region.

Further features of the present invention will be described from the following description of the example description with reference to the attached drawings.

BRIEF DESCRIPTION OF THE DRAWINGS

FIGS. 4A to 4C illustrate an example of shot images displayed by the image processing apparatus.

FIGS. 6A to 6C illustrate an example of the shot images if shooting has been performed by using the gaze region tracking mode.

DESCRIPTION OF THE EMBODIMENTS

Figure 1A:
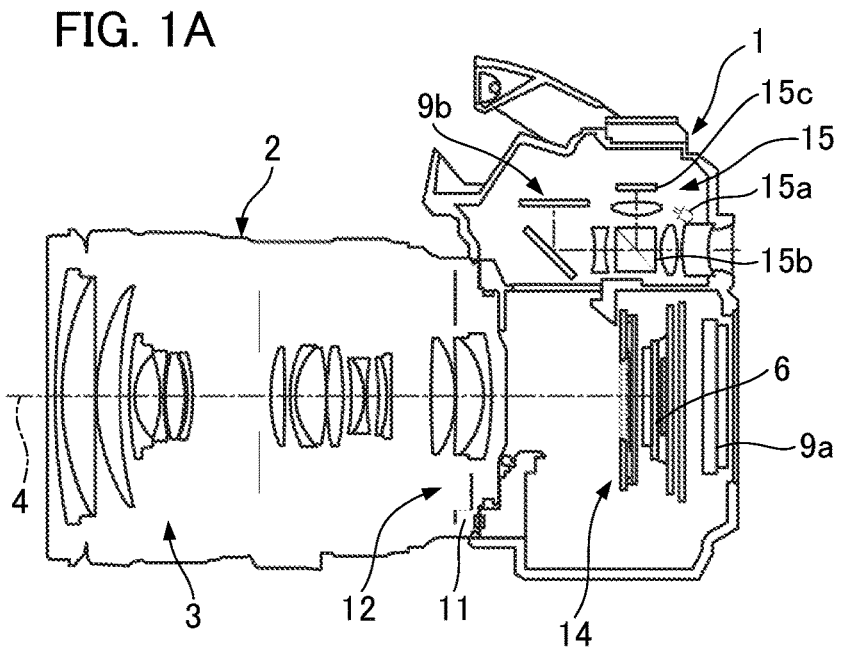
FIGS. 1A and 1B illustrate a configuration of an image processing apparatus according to the present embodiment.
Figure 1B:
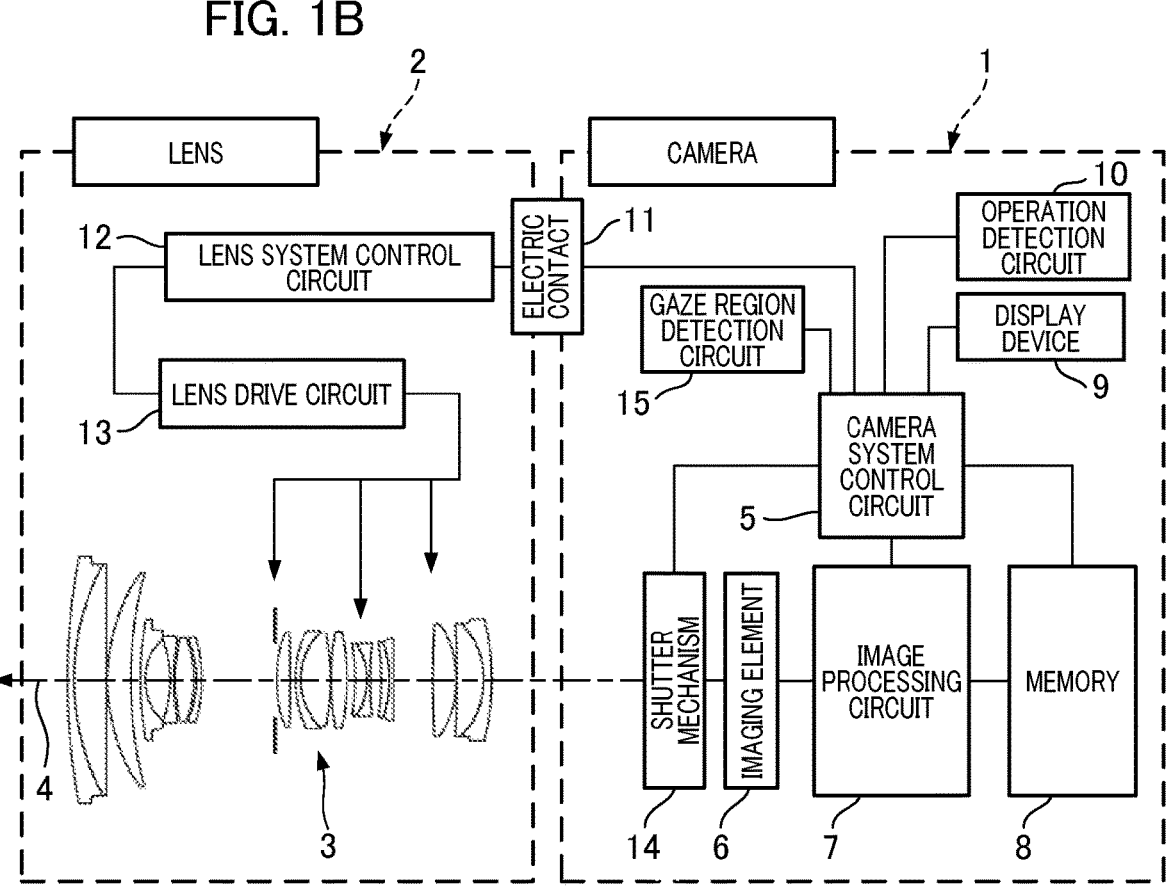

FIGS. 1A and 1B illustrate a configuration of an image processing apparatus according to the present embodiment. In FIGS. 1A and 1B, an imaging apparatus such as a digital camera will be described as an example of image processing apparatuses. Note that the present invention is applicable to any image processing apparatus that performs an image process upon receipt of the input of a shot image based on signals output from the imaging element. FIG. 1A illustrates a central cross-sectional view of the imaging apparatus. FIG. 1B illustrates a functional block diagram of the imaging apparatus. Components to which the same reference numerals are provided in FIGS. 1A and 1B correspond to each other.

A lens unit 2 shown in FIGS. 1A and 1B is a lens device that is attachable to and detachable from a camera body 1. The lens unit 2 and the camera body 1 are electrically connected at an electrical contact 11. The lens unit 2 has a lens system control circuit 12, a lens drive circuit 13, and a shooting optical system 3. The shooting optical system 3 has a plurality of lenses. The lens system control circuit 12 controls the entire lens unit 2. An optical axis 4 is the optical axis of the shooting optical system. The lens drive circuit 13 drives a focus lens, a blur correction lens, a diaphragm, and the like.

As shown in FIG. 1B, the camera body 1 includes a camera system control circuit 5, an imaging element 6, an image processing circuit 7, a memory 8, a display device 9, an operation detection circuit 10, a shutter mechanism 14, and a gaze region detection circuit 15. Additionally, as shown in FIG. 1A, the imaging apparatus includes a rear surface display device 9*a* and an electronic viewfinder (EVF) 9*b*. The operation detection circuit 10 includes a release button (not illustrated) and operates as an instruction means of the present invention. The image processing circuit 7 performs an image process on the signals output from the imaging element 6. Consequently, it is possible to detect an object in the shot image.

The camera system control circuit 5, the lens system control circuit 12, and the lens drive circuit 13 function as an image state adjustment circuit that adjusts the state of the output image presented on the electronic viewfinder 9*b* by changing the state of the shooting optical system 3. The image state adjustment circuit, for example, executes a focus adjustment process and focuses on a predetermined region. In addition to the shot image, information useful for the user is independently displayed on the electronic viewfinder 9*b* or the shot image and the information are displayed superimposed on the electronic viewfinder 9*b*. In accordance with the operation of the operation detection circuit 10, the camera system control circuit 5 determines a selection region (second region) to be used for the control of the image state adjustment circuit in the region of the shot image. The selection region is, for example, a region of a main object. The selection region may be a focus detection region where focusing is performed. Additionally, the gaze region detecting circuit 15 has a projector 15*a*, a light separator 15*b*, and a gaze region detecting sensor 15*c* shown in FIG. 1A. Since the detection of the gaze region is a well-known technique, the detailed description will be omitted. A gaze region is detected by projecting light rays that do not disturb a human visual field, such as infrared rays, to a cornea and analyzing a reflected light. Specifically, the gaze region detection circuit 15 detects a first region (gaze region), which is a region gazed at by the user, in the region of the shot image. The camera system control circuit 5 is a display control circuit that performs control to display a tracking marker and a gaze region marker on the display device 9 in a distinguishably superimposed manner. The tracking marker is second region information indicating the selection region (second region). The gaze region marker is first region information indicating the gaze region (first region).

The obtaining of shot images will be described. A light (object light) from the object forms an image on an imaging surface of the imaging element 6 via the shooting optical system 3. The imaging element 6 photoelectrically converts the object light. A focus evaluation value and an appropriate exposure amount can be obtained from the imaging element 6. Hence, by appropriately adjusting the shooting optical system 3 based on this signal, the object light with an appropriate light amount is exposed to the imaging element 6 and an object image is formed in the vicinity of the imaging element 6.

The image processing circuit 7 internally has an A/D converter, a white balance adjustment circuit, a gamma correction circuit, an interpolation calculation circuit, and the like, and can generate an image for recording. Additionally, a color interpolation processing circuit is provided in the image processing circuit 7 and performs a color interpolation (demosaicing) process based on a signal of Bayer array to generate a color image. Additionally, the image processing circuit 7 compresses, for example, images, moving images, and voices by using a predetermined method. Furthermore, the image processing circuit 7 can generate a blur detection signal based on a comparison between a plurality of images obtained from the imaging element 6.

The image generated by the image processing circuit 7 is output to the recording unit of the memory 8 by the camera system control circuit 5 and displayed on the display device 9.

Additionally, the camera system control circuit 5 generates and outputs timing signals and the like during imaging, thereby controlling each of an imaging system, an image processing system, and a recording and reproducing system in response to an external operation. For example, the operation detecting circuit 10 detects the pressing of a shutter release button (not illustrated) so that the drive of the imaging element 6, the operation of the image processing circuit 7, the compression process, and the like are controlled. Furthermore, the camera system control circuit 5 controls the state of each segment of the information display apparatus that displays information on, for example, a liquid crystal monitor by the display device 9. Note that, in this example, the back face display device 9*a* is a touch panel and is connected to the operation detection circuit 10.

A description will be given of the adjustment operation of the optical system by a control system. The image processing circuit 7 is connected to the camera system control circuit 5, in which an appropriate focal position and a diaphragm position are determined based on signals from the imaging element 6. The camera system control circuit 5 issues a command to the lens system control circuit 12 via the electric contact 11, and the lens system control circuit 12 appropriately controls the lens drive circuit 13. Moreover, in a mode in which camera shake correction is performed, the blur correction lens is appropriately controlled via the lens drive circuit 13 based on signals obtained from the imaging element. The lens system control and the lens drive circuit function as an optical system drive circuit of the present invention. Additionally, the camera system control circuit 5 controls the shutter mechanism 14 and executes exposure control.

Figure 2A:
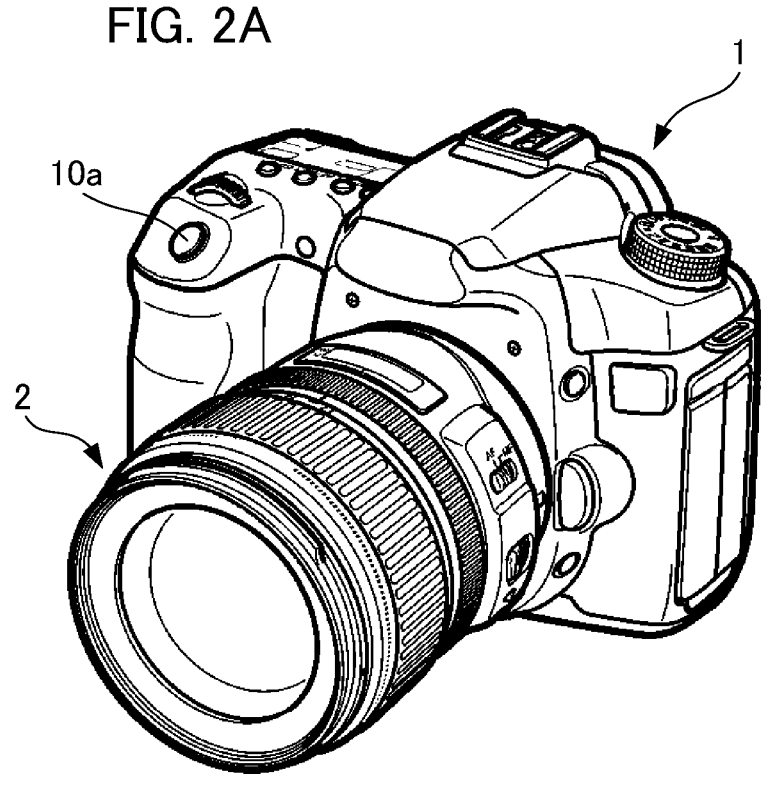
FIGS. 2A and 2B illustrate an example of an appearance of an imaging apparatus.
Figure 2B:
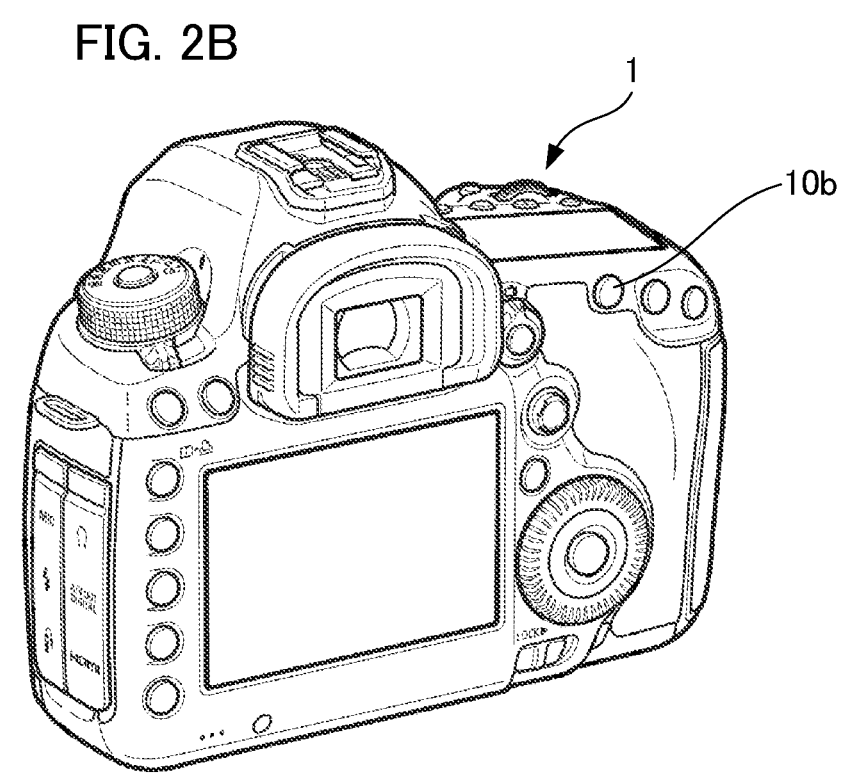

FIGS. 2A and 2B illustrate an example of an appearance of the imaging apparatus. FIG. 2A illustrates the front of the imaging apparatus. FIG. 2B illustrates the back of the imaging apparatus. A release button 10*a* forms a part of the operation detection circuit 10. Additionally, an operation button 10*b* is an operation button different from the release button. The operation button 10*b* also forms a part of the operation detection circuit 10. The operation button 10*b* operates as a trigger input button.

Figure 3:
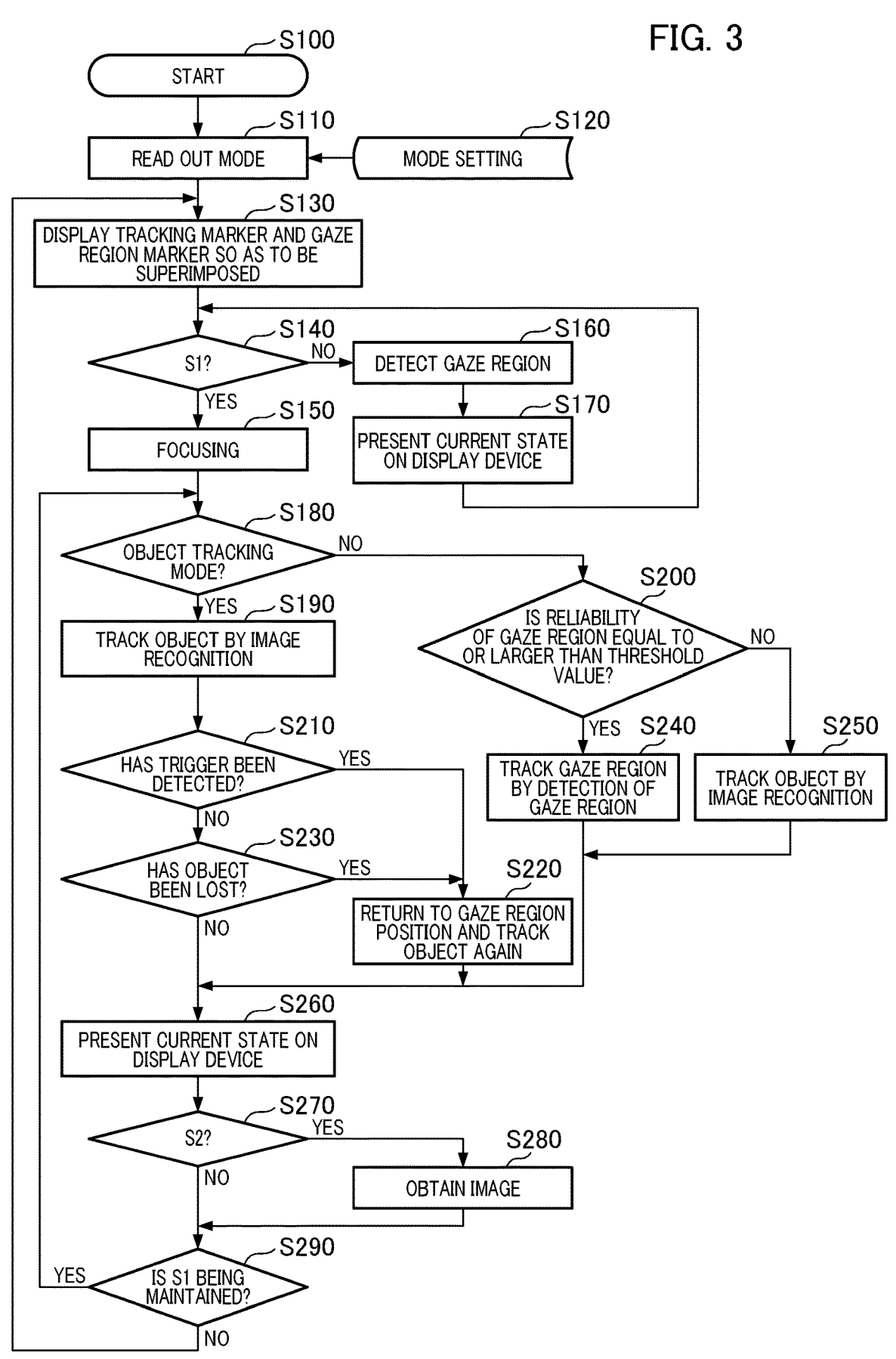
FIG. 3 is a flowchart illustrating an example of an operation process of the imaging apparatus.

FIG. 3 is a flowchart illustrating an example of an operation process of the imaging apparatus. In S100, when a power source of the imaging apparatus is turned on, the operation starts. In S110, the camera system control circuit 5 reads out the operation mode. The camera system control circuit 5 reads out setting S120 that has been predetermined and reflects the setting in the operation. In this example, the operation mode is a mode with respect to an operation in which focusing is performed. As a first operation mode, there is an object tracking mode indicating that the setting of the position for focusing after focusing is once performed by tracking the main object by image recognition, in other words, focusing is performed to serve the region of the main object as the selection region. Additionally, as a second operation mode, there is a gaze region tracking mode indicating the setting of the selection region in which focusing is performed based on the detected gaze region. Note that, here, although an explanation will be given by using an example of the operation mode in which a process that focuses on the selection region is performed, the present invention is not limited thereto. It is also possible to perform processes such as the adjustment of exposure values, the adjustment of colors such as hue and saturation, the correction of contrast and gradation, or the determination of a compression level of image signals, based on the selection region. Additionally, instead of a process during shooting, information indicating the selection region may be recorded together with a shot image to serve as information for reference in an image process during reproduction.

In the camera body 1, an instruction for shooting preparation is provided by the half-pressing operation of the release button 10a referred to as "S1", and focusing is executed. Subsequently, the image is obtained (shot) by the complete-pressing operation of the release button 10a referred to as "S2". The user determines a composition (framing) at the stage before focusing, determines an object by S1, determines an image to be shot (aiming), and performs shooting by S2 (shooting). At this time, the operation of determining the focusing position after aiming is also performed.

Next, in S130, the camera system control circuit 5 displays the tracking marker and the gaze region marker at the identical position in the shot image. That is, since there is no concept of tracking before the operation of S1, the camera system control circuit 5 displays the gaze region marker and the tracking marker based on the information at the same position. After the operation of S1, the gaze region marker and the tracking marker are displayed based on information about positions that differ from each other. More specifically, after the operation of S1, the camera system control circuit 5 displays the gaze region marker based on the information indicating the position of the gaze region, and displays the tracking marker based on the information indicating the position of the selection region. Subsequently, in S140, it is determined whether or not S1 has been operated. If S1 has been operated by pressing the release button 10a in FIG. 2A halfway, the process proceeds to S150. If S1 has not been operated, the process proceeds to S160.

In S150, the image state adjustment circuit, that is, the camera system control circuit 5, the lens system control circuit 12, and the lens drive circuit 13 perform focusing. Further, the image state adjustment circuit also obtains a template in the region where focusing has been performed. This template is used for template matching to be described below as necessary. That is, the image state adjustment circuit determines the selection region to be used for executing an adjustment process of the image state (for example, focusing) in response to the operation of the first instruction member S1. The first instruction member is, for example, an operating button for instructions for shooting preparation. The image state adjustment circuit determines, for example, the selection region within a face region obtained by face detection. Then, the image state adjustment circuit performs focusing on the selection region.

In S160, the camera system control circuit 5 instructs the gaze region detection circuit 15 to detect the gaze region. Subsequently, in S170, the camera system control circuit 5 displays the current information, that is, the shot image, the tracking marker, and the gaze region marker on the display device 9, and then the process returns to step S140. That is, the camera system control circuit 5 displays the tracking marker and the gaze region marker based on the information indicating the position of the gaze region.

In the processes following S180, the camera system control circuit 5 determines the selection region based on the operation mode with respect to the focusing operation and information indicating a shooting state. The information indicating the shooting state is, for example, a state in which a trigger in S210, to be described below, is detected, information indicating the reliability of the result of the detection of the object to be used in S230, and information indicating the reliability of the gaze region in S200. The reliability of the result of the detection of the object indicates the magnitude of an evaluation value related to the detection of the object. The reliability of the gaze region indicates the magnitude of the evaluation value with respect to the detection of the gaze region. In S180, the camera system control circuit 5 determines whether or not the operation mode read out in S110 is the object tracking mode. If the operation mode is the object tracking mode, the process proceeds to S190. If the operation mode is not the object tracking mode but the gaze region tracking mode, the process proceeds to S200.

Next, in S190, the camera system control circuit 5 performs object tracking by image recognition. Specifically, the camera system control circuit 5 tracks the object based on the object detected by image recognition. That is, the camera system control circuit 5 determines a region corresponding to the position of the region of the object that has been determined based on the shot image to serve as the selection region. Since there are many prior documents regarding methods for tracking an object such as template matching, the details will not be described here. At this time, the reliability of the calculation can be measured based on of a matching degree of template matching. The measured reliability is defined as the reliability of the result of the detection of the object. Specifically, if the position of the object in a screen has changed, the camera system control circuit 5 moves information indicating the position to be focused (for example, a focus detection frame showing a focus detection region) to follow the object, thereby continuing to focus on the same object.

Next, in S210, the camera system control circuit 5 determines whether or not a trigger has been detected. If the user operates the operation button 10b, which is a second instruction member different from the release button 10a shown in FIG. 3, a trigger is generated. If a trigger has been detected, the process proceeds to S220. If a trigger has not been detected, the process proceeds to S230.

In S220, the camera system control circuit 5 determines the region corresponding to the position of the gaze region to serve as the selection region, and starts tracking again. Specifically, the camera system control circuit 5 sets a focus detection frame at the position of the gaze region, executes a focus detection process, performs focusing, obtains the template at the position, and starts tracking again. The process of S220 corresponds to the setting of the selection region to the position of the gaze region once, in other words, corresponds to the display of the tracking marker based on the information indicating the position of the gaze region. After that, the selection region is determined based on the detected object by the process of S190, and then the process proceeds to S260. The focus detection frame can be returned to the gaze region if an unintended transfer in the focus detection region is caused due to the process of S210 and the process of S220.

Next, in S230, the camera system control circuit 5 determines whether or not the user has lost the object (has lost sight of the object). If the reliability of the result of the detection of the object is lower than the predetermined threshold value, the camera system control circuit 5 determines that the object has been lost. If the reliability of the result of the detection of the object is equal to or greater than the predetermined threshold value, the camera system control circuit 5 determines that the object has not been lost. If another object crosses the front of the object and the template matching is very unsatisfactory, the camera system control circuit 5 determines that the object has been lost. If the object has been lost, the process proceeds to S220. If the object has not been lost, the process proceeds to S260. If the object has been lost, the focus detection frame can be returned to the gaze region by the process of S230 and the process of S220.

Additionally, in S200, the camera system control circuit 5 determines whether or not the reliability of the gaze region by the gaze region detection circuit is equal to or greater than the threshold value. If the reliability of the gaze region is equal to or greater than the threshold value, the process proceeds to S240. If the reliability of the gaze region is lower than the threshold value, the process proceeds to S250. The detection of the gaze region may temporarily become inaccurate due to the influence of an external light and the like. The determination process of S200 is a process for performing an appropriate operation in this case.

In S240, the camera system control circuit 5 determines the position of the focus detection frame based on the result of the detection of the gaze region by the gaze region detection circuit. Specifically, the camera system control circuit 5 determines a region at a position corresponding to (identical to) the position of the gaze region to serve as the selection region. Then, the camera system control circuit 5 tracks the gaze region as the position of the focus detection frame and performs focusing. Subsequently, the process proceeds to S260. Additionally, in S250, the camera system control circuit 5 performs object tracking by image recognition. That is, the camera system control circuit 5 determines the region corresponding to the position of the gaze region to serve as the selection region. Then, the process proceeds to S260.

Next, in S260, the camera system control circuit 5 displays the current information by the display device. Specifically, a first marker corresponding to the gaze region and a second marker corresponding to the selection region are displayed superimposed on the shot image. Subsequently, the camera system control circuit 5 determines whether or not S2 has been operated. If the user presses the release button 10*a* completely to operate S2, the process proceeds to S280. If S2 has not been operated, the process proceeds to S290.

In S280, the camera system control circuit 5 obtains the shot image output by shooting, and then, the process proceeds to S290. In S290, the camera system control circuit 5 determines whether or not S1 is being maintained. If S1 is being maintained, the process proceeds to S180. If S1 is released, the process proceeds to S130. Note that the camera system control circuit 5 determines that S1 is being maintained while S2 is being operated. That is, if S2 continues to be pressed by, for example, continuous shooting, the process proceeds with S1 being maintained. If the power source is turned off, an interruption occurs regardless of the process shown in the flowchart of FIG. 3, and the operation ends at that point in time.

According to the explanation with reference to FIG. 3, in the gaze region tracking mode, focusing corresponding to the gaze region is performed irrespective of S1, which is the operation of the instruction member by the user. In contrast, in the object tracking mode, the selection between the region corresponding to the detected object (after S1) and the region corresponding to the gaze region (before S1) is switched in conjunction with the movement of the instruction member. By providing such a plurality of modes, shooting in response to the intention by the user can be performed. Specifically, it is possible to properly use a mode in a case in which the accurate tracking of the gaze region is requested and a mode in a case in which focusing is maintained while also confirming a surrounding situation after focusing.

Additionally, paying attention to the state of display, in the object tracking mode, the first marker and the second marker are displayed at the identical position before the instruction member is operated (before S1). After the instruction member is operated (after S1), the first marker and the second marker are displayed based on the values associated with each other. Also in the gaze region tracking mode, the display similar to that in the object tracking mode is performed if it is assumed that the selection region is associated with the gaze region.

FIGS. 4A to 4C illustrate one example of shot images displayed by the image processing apparatus according to the present embodiment. FIGS. 4A, 4B and 4C illustrate three temporally different images in which time has passed in this order. FIG. 4A is a display example in a state before S1 (referred to as "S0"). FIG. 4B is a display example at the moment when S1 is pressed. FIG. 4C is a display example in a state in which S1 is being maintained.

In FIGS. 4A to 4C, a presented image 20 shows an image (shot image) presented to the EVF 9*b*. The first object 21 shows a first object. A gaze region marker 22 shows a gaze region marker (shown by a rectangular frame), serving as the first marker corresponding to the gaze region. A tracking marker 23 shows a tracking marker (shown by "+") serving as the second marker corresponding to the selection region. A second object 24 is a second object.

In the examples shown in FIGS. 4A to 4C, the camera system control circuit 5 performs display on which the markers are superimposed on the shot image. FIG. 4A illustrates a point in time before S1, wherein the process stays in S140 in FIG. 3. In this state, the gaze region marker 22 and the tracking marker 23 are displayed so as to be superimposed at the position of the gaze region by the operations in S160 and S170. That is, the gaze region marker 22 and the tracking marker 23 are displayed at the position gazed at by the user.

In FIG. 4B, the user provides instructions for S1 by pressing the release button 10*a* halfway while viewing the object. FIG. 4B corresponds to steps from step S140 to step S150 in FIG. 3. In FIG. 4B, the gaze region marker 22 and the tracking marker 23 are displayed superimposed, the focusing is performed at the position of the gaze region, and the template is obtained. In FIG. 4B, focusing is performed on the face portion of the first object 21 and the template is obtained at that portion.

In FIG. 4C, since S1 is being maintained after S1, the camera system control circuit 5 executes the operation in the object tracking mode. Since the operation mode is the object tracking mode, processes from step S180 to step S190 in FIG. 3 are performed. At this time, in step S190, the focus detection frame moves by image recognition. That is, if the object moves within the screen, the camera system control circuit 5 keeps on focusing at a region where the focusing has been performed at the point in time of S1, and displays the second marker corresponding to the selection region on the position. In FIG. 4C, the tracking marker 23 (second marker) is displayed on the face (selection region) of the first object 21. At this time, since the gaze region marker 22 is displayed at the position corresponding to the detected result of the gaze region, the gaze region marker 22 is not necessarily displayed at the position that is the same as that of the tracking marker 23.

In the example of FIG. 4C, the user is paying attention to the second object 24. Accordingly, the displays shown in FIGS. 4A to 4C can be used in, for example, shooting of a sports scene by a user, in which there is a plurality of moving objects (players), wherein focusing is performed on a player serving as an object, and then another player serving as another object is also searched while staying in focus. In a case where a ball is passed in a ball game, the switching between the objects becomes easy. This is because, after the detection of the trigger in S210 in FIG. 3, the process proceeds to S220, and the focusing and tracking can start again at the gaze region position. If a trigger is generated by the operation of the operation button 10b by the user at the timing shown in FIG. 4C, the camera system control circuit 5 performs focusing on the second object 24, and thereafter tracks the second object 24. In another trigger generation method, S1 is released once and S1 is pressed again. By performing this operation, the process proceeds as shown in S290, S130, S140, and S150 in FIG. 3, and the focusing and tracking can start again at the gaze region position.

Figure 5A:
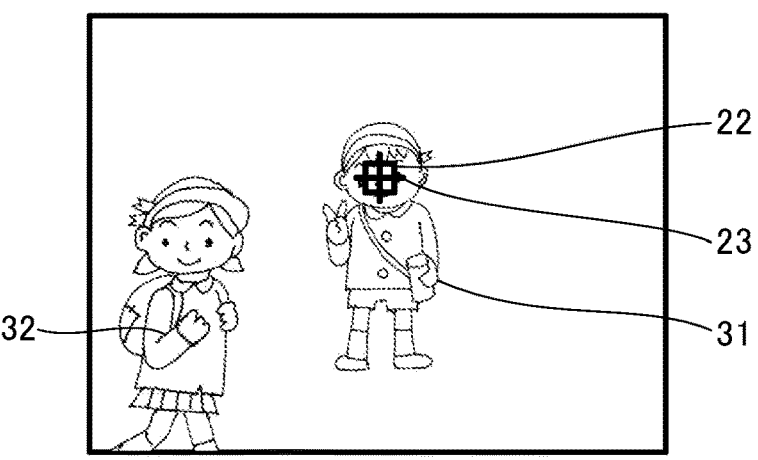
FIGS. 5A to 5C illustrate another example of the shot images displayed by the image processing apparatus.
Figure 5B:
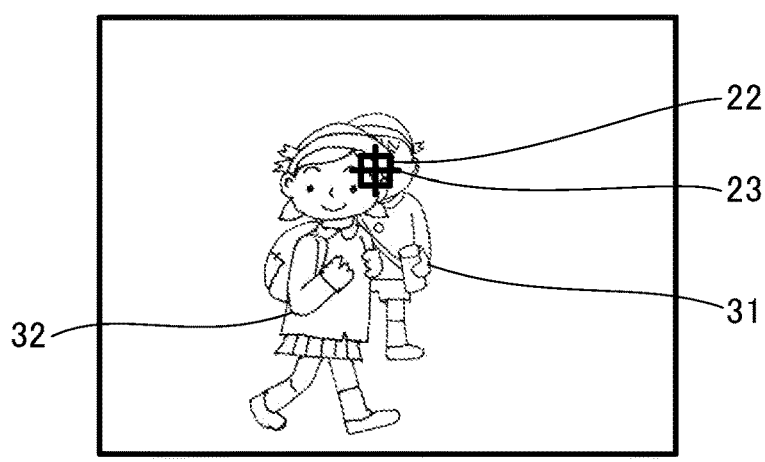
Figure 5C:
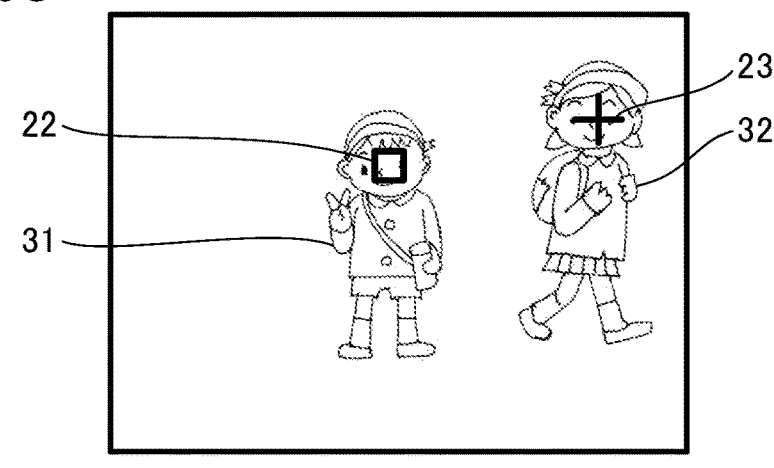

FIGS. 5A to 5C illustrate another example of the shot images displayed by the image processing apparatus of the present embodiment. The example shown in FIGS. 5A to 5C assumes a case in which the first object 31 is the main object and the second object 32 is crossing the front of the first object when the user is waiting for the best timing for pressing the shutter. As a scene similar to the example shown in FIGS. 5A to 5C, a school play scene is assumed in which a person crosses the front of a person serving as the main object. FIGS. 5A, 5B, and 5C illustrate temporally different three images in which time has passed in this order. In FIGS. 5A to 5C, the same reference numerals are provided for elements having functions that are the same as those in FIGS. 4A to 4C. In FIGS. 5A to 5C, the first object 31 shows the first object and the second object 32 shows the second object. FIG. 5A illustrates the state at the moment of pressing S1. FIG. 5B and FIG. 5C illustrate the state in which S1 is being maintained.

In the states shown in FIGS. 5A to 5B, the camera system control circuit 5 sets the focus detection frame on the first object 31 and performs focusing. At this time, if the user continues to gaze at the first object, the gaze region marker 22 and the tracking marker 23 are displayed at substantially the same place. If the user gazes at an another region, the gaze region marker 22 is displayed at the position of the detected gaze region and the tracking marker 23 is displayed on the first object 31, as shown in FIGS. 4A to 4C although not as shown in FIGS. 5A to 5C.

As shown in FIG. 5B, a case is assumed in which the second object crosses the front of the main object, thereby causing an inappropriate transfer of the focus detection frame. If objects such as human faces resembling each other cross the front of the main object, an inappropriate transfer of the focus detection frame may be caused by template matching. In this case, after the state shown in FIG. 5B, the focus detection frame is set on the face of the second object 32 and focusing is performed.

As shown in FIG. 5C, if the user is gazing at the first object, the gaze region marker 22 is displayed on the first object 31 and the tracking marker 23 is displayed on the second object 32. Hence, the user can recognize that the focusing has deviated from the first object 31. In order to focus on the first object 31 in the state of FIG. 5C, the user can operate the operation button 10b to generate a trigger as described with reference to FIG. 3. Similar to the example shown in FIGS. 4A to 4C, the user may release S1 and press it again. As shown in FIGS. 5A to 5C, if inappropriate focus tracking is caused, an opportunity for such as readjustment of focus can be given by presenting appropriate information to the user.

Additionally, in the state shown in FIG. 5B, if the matching degree of template matching becomes unsatisfactory due to the crossing of the front by the object, the focus may be automatically reset at the gaze region position. For example, if an object crossing in front is significantly different in shape from the original template (a human's face in the present embodiment), for example, an automobile, an appropriate corresponding region cannot be found because of the failure to transfer the focus detection frame. In such a case, it is only necessary to perform focusing again at the gaze region position. The large difference in a template is caused until the crossing object completely passes by, and as a result, the focusing is performed at the gaze region position. Subsequently, when the object passes by, the tracking of the original object starts again. In FIG. 3, in S230, it is determined whether or not the object has been lost as a result of no longer finding an appropriate corresponding region. If it is determined that the object has been lost, focusing is performed at the gaze region position in S220. Consequently, even if an automobile and the like crosses the front of a person, focusing is automatically performed again at the gaze region, and the main object is brought into focus again after the automobile has passed by.

FIGS. 6A to 6C illustrate an example of the shot images in a case in which the scenes that are the same as those in FIGS. 4A to 4C are shot in the gaze region tracking mode. In FIGS. 6A to 6C, the same reference numerals are provided for elements that are the same as those in FIGS. 4A to 4C. The timing of S1 in FIGS. 6A to 6C is different from that in FIGS. 4A to 4C. FIG. 6A illustrates a state at the moment of S1. FIG. 6B and FIG. 6C illustrate a state in which S1 is maintained. Additionally, in FIGS. 6A to 6C, it is assumed that the operation mode is the gaze region tracking mode in which focusing continues to be performed at the gaze region. That is, FIGS. 6A to 6C correspond to the case in which the process proceeds to from S180 to S200 in FIG. 3.

As shown in FIG. 6A, until the moment of S1, the tracking marker 23 and the gaze region marker 22 overlap. In the gaze region tracking mode, the tracking marker and the gaze region marker overlap after the moment of S1 as well. In the examples shown in FIGS. 6A to 6C, the thickness of the marker is made different in order to clearly indicate that tracking is being performed based on either the result of detection of the gaze region or the result of detection of the object. In FIGS. 6A and 6B, since the position at which the marker is to be presented is determined based on the detected gaze region, the gaze region marker 22 is shown by a bold line and the tracking marker 23 is shown by a thin line. In FIG. 6C, since the position at which the marker is to be presented is determined based on the object detected by image recognition, the tracking marker 23 is shown by a bold line and the gaze region marker 22 is shown by a thin line. Note that, instead of a difference in the thickness of the marker, a difference in color may be used for determining the position at which the marker is to be presented by either the result of detection of the gaze region or the result of detection of the object.

A case is assumed in which the gaze region can properly be detected during the state shown in FIG. 6A to the state shown in FIG. 6B. At this time, the reliability of the gaze region is equal to or greater than the threshold value and corresponds to the case in which the process proceeds from S200 to S240 in FIG. 3. At this time, the camera system control circuit 5 determines the position at which the marker is to be presented based on the result of the detection of the gaze region. A case is assumed in which the gaze region cannot be properly detected at some point in time during the process proceeding the states from FIG. 6B to FIG. 6C. The gaze region detection may not operate properly if stray light such as sunlight is present. At this time, the reliability of the gaze region is equal to or less than the threshold value, and corresponds to the case in which the process proceeds from S200 to S250 in FIG. 3. At this time, the camera system control circuit 5 determines the position at which the marker is to be presented based on the object detected by image recognition. According to the display operation described with reference to FIGS. 6A to 6C, even if the output of the gaze region detection circuit is inappropriate, it is possible to maintain in focus so as not to miss the best timing for pressing the shutter while continuing the tracking by the detection of the object. As described above, according to the image processing apparatus of the present embodiment, it is possible to present information to the user that enables intuitively performing the confirmation of the focus state and the selection of an object to be focused to the user.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-021134, filed, which is hereby incorporated by reference wherein in its entirety.

What is claimed is:

1. A display control apparatus, comprising:
one or more processors; and memory storing instructions that, when executed by the one or more processors, cause the display control apparatus to perform operations including:
detecting a position gazed at by a user in an image of a plurality of displayed images;
tracking an object in the plurality of images;
displaying an image with first information indicating the gaze position and second information indicating a region of the tracked object; and
in response to a predetermined user input detected while the first information is on another object different from the tracked object, updating the tracking so that said other object becomes a new object to be tracked.

2. The display control apparatus according to claim 1, wherein the region of the tracked object is detected by image recognition.

3. The display control apparatus according to claim 1, wherein the object is tracked by template matching.

4. The display control apparatus according to claim 1, wherein when a predetermined user input is received, displaying an image in which the first information and the second information are superimposed.

5. The display control apparatus according to claim 1, wherein when a predetermined user input is received, displaying the first information and the second information based on the position gazed at by the user in the image.

6. The display control apparatus according to claim 5, wherein after the predetermined user input is received, displaying the first information based on the position gazed at by the user in the image; and displaying the second information based on a tracking position of the tracked object.

7. The display control apparatus according to claim 1, wherein the first information and the second information are different in at least one of color, size, and shape.

8. The display control apparatus according to claim 1, wherein the position gazed at by the user is detected by analyzing a reflected light from the user's eye.

9. The display control apparatus according to claim 1, wherein the memory further stores instructions that cause the display control apparatus to perform operations including focusing on a region where the second information is superimposed in the image.

10. The display control apparatus according to claim 1, further comprising an operation unit, wherein the operation unit receives a predetermined user input from the user.

11. An imaging apparatus comprising:
an imaging sensor that photoelectrically converts an object light;
one or more processors; and
memory storing instructions that, when executed by the one or more processors, cause the imaging apparatus to perform operations including:
detecting a position gazed at by a user in an image of a plurality of displayed images;
tracking an object in the plurality of images;
displaying an image with first information indicating the gaze position and second information indicating a region of the tracked object; and
in response to a predetermined user input detected while the first information is on another object different from the tracked object, updating the tracking so that said other object becomes a new object to be tracked.

12. A control method of a display control apparatus comprising:
detecting a position gazed at by a user in an image of a plurality of displayed images;

tracking an object in the plurality of images;

displaying an image with first information indicating the gaze position and second information indicating a region of the tracked object; and in response to a predetermined user input detected while the first information is on another object different from the tracked object, updating the tracking so that said other object becomes a new object to be tracked.

13. A display control apparatus, comprising:

one or more processors; and memory storing instructions that, when executed by the one or more processors, cause the display control apparatus to perform operations including:

detecting a position gazed at by a user in an image;

tracking an object in a plurality of images; and performing control to display the images in which first information and second information that is different from the first information are superimposed;

wherein displaying an image in which the first information is superimposed on a position corresponding to a detected position gazed at by the user, and displaying the image in which the second information is superimposed on a region corresponding to a region of a main object, wherein when a predetermined instruction is executed, displaying an image in which the first information and the second information are superimposed on a position corresponding to a detected position gazed at by a user.

14. The display control apparatus according to claim 13, wherein when a predetermined instruction is executed, displaying the image in which the first information and the second information are superimposed.

15. The display control apparatus according to claim 13, wherein the first information and the second information are different in at least one of color, size, and shape.

16. The display control apparatus according to claim 13, wherein the position gazed at by the user is detected by analyzing a reflected light from the user's eye.

17. The display control apparatus according to claim 13, wherein the memory further stores instructions that cause the display control apparatus to perform operations including focusing on a region where the second information is superimposed in the image.

18. The display control apparatus according to claim 13, further comprising an operation unit, wherein the operation unit receives the predetermined instruction from the user.

19. An imaging apparatus comprising:

an imaging sensor that photoelectrically converts an object light;

one or more processors; and memory storing instructions that, when executed by the one or more processors, cause the imaging apparatus to perform operations including:

detecting a position gazed at by a user in an image;

tracking an object in a plurality of images; and performing control to display the images in which first information and second information that is different from the first information are superimposed;

wherein displaying an image in which the first information is superimposed on a position corresponding to a detected position gazed at by the user, and displaying the image in which the second information is superimposed on a region corresponding to a region of a main object, wherein when a predetermined instruction is executed, displaying an image in which the first information and the second information are superimposed on a position corresponding to a detected position gazed at by a user.

20. A control method of a display control apparatus comprising:

detecting a position gazed at by a user in an image;

tracking an object in a plurality of images; and performing control to display the images in which first information based on a position gazed at by a user and second information indicating a region of an object to be tracked are superimposed;

wherein an image in which the first information is superimposed on a position corresponding to a detected position gazed at by the user, and in which the second information is superimposed on a region corresponding to a region of a main object is displayed, wherein when a predetermined instruction is executed, an image in which the first information and the second information are superimposed on a position corresponding to a detected position gazed at by the user is displayed.

* * * * *